United States Patent
Xiong et al.

(10) Patent No.: US 7,194,030 B2
(45) Date of Patent: Mar. 20, 2007

(54) METHOD FOR PRE-SUPPRESSING NOISE OF IMAGE

(75) Inventors: Lianhuan Xiong, Shenzhen (CN); Zhen Chen, Shenzhen (CN); Jing Wang, Shenzhen (CN); Hongyuan Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 813 days.

(21) Appl. No.: 10/601,732

(22) Filed: Jun. 24, 2003

(65) Prior Publication Data

US 2004/0062316 A1     Apr. 1, 2004

Related U.S. Application Data

(63) Continuation of application No. PCT/CN02/00110, filed on Feb. 25, 2002.

(30) Foreign Application Priority Data

Feb. 27, 2001  (CN)  ............... 01 1 09026

(51) Int. Cl.
*H04N 7/12*     (2006.01)
*H04B 1/66*     (2006.01)

(52) U.S. Cl. ............................... 375/240.02

(58) Field of Classification Search ............ None
See application file for complete search history.

(56) References Cited

U.S. PATENT DOCUMENTS 5,325,125 A * 6/1994 Naimpally et al. .... 375/240.12
5,787,203 A * 7/1998 Lee et al. ............... 382/232
6,370,502 B1 * 4/2002 Wu et al. ............... 704/230
6,385,343 B1 * 5/2002 Kuroda et al. ............ 382/233
2002/0186890 A1 * 12/2002 Lee et al. ............... 382/239
2003/0039394 A1 * 2/2003 Yamazaki .............. 382/176
2003/0053708 A1 * 3/2003 Kryukov et al. .......... 382/261
2003/0142750 A1 * 7/2003 Oguz et al. .......... 375/240.18

FOREIGN PATENT DOCUMENTS

WO       WO 00/42772       7/2000

* cited by examiner

*Primary Examiner*—Nhon Diep
(74) *Attorney, Agent, or Firm*—Bacon & Thomas, PLLC

(57) ABSTRACT

A method for pre-suppress noise of an image at least includes the following steps: detecting whether the currently processed DCT coefficient value is equal to or less than a corresponding threshold used for this time during quantizing DCT (Discrete Cosine Transform) coefficients of a CIF (Common Intermediate Format) image blocks in sequence, if it is, setting the DCT coefficient to zero, then increasing the threshold of this time to be used as a threshold of next time for the DCT coefficient processing, otherwise recovering the threshold used for this time to a predetermined initial threshold, which will be used as the next time threshold for the next processing of DCT coefficient; detecting whether the increased threshold is greater than a predetermined upper limit of a threshold, if it is, substituting the increased threshold with the predetermined upper limit.

8 Claims, 3 Drawing Sheets

| 1 | 2 | 6 | 7 | 15 | 16 | 28 | 29 |
|---|---|---|---|---|---|---|---|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

Low-frequency component

High-frequency component

METHOD FOR PRE-SUPPRESSING NOISE OF IMAGE

This application is a continuation of International Application PCT/CN02/00110, filed Feb. 25, 2002, of which the entire disclosure of the pending, prior application is hereby incorporated by reference.

FIELD OF THE TECHNOLOGY

The present invention relates generally to multimedia communication field, and more particularly to a method for pre-suppress noise of an image at transmitting end.

BACKGROUND OF THE INVENTION

In general, a video image includes massive amounts of data. It is infeasible to communicate and to store a video image directly. Examples of communicating video images are videoconferences, video telephones and remote teaching, etc. Examples of storing video images are multimedia databases, VCD and DVD, etc. In a video service system, except video data, there are also audio data, T.120 data and control information, etc. At the same time, it is highly required that a video service system is real time, interactive and having good image quality. Therefore, the video image data should be compressed with a high compression rate. At present, there are international standards for video image compression. H.261 and H.263 are standardized by ITU-T, and MPEG1, MPEG2 and MPEG4 are standardized by ISO. In these standards, some present important compression techniques are involved, and they have many common issues, such as they all use Common Intermediate Format (CIF), they all use hybrid mode of Motion-Compensated Prediction and Discrete Cosine Transform (DCT), etc.

In a video system, implemented with the above standards, it is unavoidable that an acquired video image involves some noise. For example, there are high-frequency impulse noise, caused by the large changes in luminance components and chrominance components at a small region of an image, and random noise, generated by A/ID conversion and quantization during signal sampled. Without suppressing the noise before compression, the compression efficiency will be greatly decreased. Therefore, in order to have a better compression efficiency and a good image quality, it is necessary to have a pre- and post-processing to reduce or eliminate the noise in an image.

There are many existing methods for suppressing noise. In general, each one of them uses an adequate filtering method in the spatial domain or frequency domain. The filtering methods can be divided into: linear filtering, such as one-dimension finite impulse response (1-D FIR) filtering, two-dimensions finite impulse response (2-D FIR) filtering, etc., and non-linear filtering, such as median filtering, threshold filtering, etc.

Reference to the U.S. Pat. No. 5,787,203 patent, titled "Method and system for filtering compressed video images", which discloses a method for filtering in the spatial domain. A nonlinear filtering method is used for the differences of images after motion-compensated prediction and before DCT. There are two times of filtering: first a threshold filter that reduces or eliminates random noise, then a cross-shaped median filter that reduces or eliminates high frequency impulse noise. They reduce the overall compression bitrate by 10% to 20%. Reference to the U.S. Pat. No. 5,325,125 patent, titled "Intra-frame filter for video compression systems", which discloses a method with linear filtering directly before compression. The method applies a two dimensional (2-D) filter to filter out high frequency components and high frequency impulse noise in the image diagonal direction.

In order to reduce or eliminate noise effectively, in the present suppressing noise methods, a one-dimension or two-dimension filtering process is added in the original processing procedure. Nevertheless, in general, a filtering calculation takes time and is a heavy load for a system. So, for the video conference system, which highly requires real time and interactive, it is necessary to have an suppressing noise method which does not take time and keeps the original image as much as possible. In the present filtering technology, the threshold filtering is a method with less amount of calculation. The basic principle of this method is: at a transmitting end, quantizing DCT coefficients of a CIF image blocks is in preset sequence; when a DCT coefficient is equal or less than a predetermined threshold, the DCT coefficient is set to zero; and when a DCT coefficient is greater than the predetermined threshold, the DCT coefficient is unchanged. In essence, the method of pre-suppressing noise is a constant threshold filtering method. The disadvantage of these pre-suppressing noise methods is that selection of a threshold is conflict. If a smaller threshold is selected, a higher image quality can be obtained; but with too small number of DCT coefficient zero value, the compression efficiency is not satisfied. If a larger threshold is selected, the compression efficiency is satisfied; but with too many number of DCT coefficient zero value, the image quality is not satisfied.

SUMMARY OF THE INVENTION

Purpose of the invention is to provide a method with an adaptive threshold filtering to pre-suppress noise in an image. Comparing with the constant threshold filtering method, the method can further increase image compression efficiency without decreasing the image quality.

Purpose of the invention is implemented as follows. A pre-suppressing noise method for an image comprises the following steps. At the transmitting end, quantizing DCT coefficients of a CIF image blocks is in sequence. If the currently processed DCT coefficient value is equal or less than a corresponding threshold used for this time, the DCT coefficient will be set to zero. At the same time, the threshold of this time is increased and will be used as a threshold of next time for the DCT coefficient processing. If the increased threshold is greater than a predetermined upper limit of a threshold, then the increased threshold is substituted with the predetermined upper limit of a threshold. If the currently processed DCT coefficient value is greater than the corresponding threshold, used for this time processing, the threshold is recovered to a predetermined initial threshold, which will be used as the next time threshold for the next processing of DCT coefficient.

The method for pre-suppressing noise of an image further includes the followings. At transmitting end, transforming a video image from the CCIR 601 format to the CIF applies a low-pass FIR filter, in which the cut-off frequency is less than $0.5\pi$. Wherein the CCIR stands for Consultative Committee on International Radio, and CCIR 601 is the 601 standard proposed by CCIR, which defines a digital video standard for broadcasting corresponding to 525 lines to 625 lines television system. The luminance component and chrominance component are filtered by the low-pass FIR filter at vertical and horizontal direction, respectively.

Said low-pass FIR filter is one-dimensional FIR filter.

The cut-off frequency of said low-pass FIR filter is between 0.25π to 0.4π.

After the luminance component and chrominance component have been processed by a low-pass FIR filter with less than 0.5π cut-off frequency, the image is further filtered by a two-dimensional median filter.

If the currently processed DCT coefficient value is equal or less than a corresponding threshold used for this time, the DCT coefficient will be set to zero. At the same time, the threshold of this time is increased by one and will be used as a threshold of next time for the DCT coefficient processing.

Said DCT coefficients is processed in sequence is that the sequence is started from the upper left corner of a DCT coefficient table and is ordered in a zigzag pattern.

Said an initial threshold and an upper limit of threshold can be predetermined in that the initial threshold equals to kQ and the upper limit of threshold equals 1.5 kQ. Wherein Q is the quantized level and k is a constant between zero to one determined by the channel bandwidth.

The method for pre-suppressing noise in an image can be understood as a filtering method with an adaptive threshold. Comparing with the constant threshold filtering method, the noise can be more efficiency suppressed without decreasing the image quality, and the image compression efficiency is increase further. Of course, when an image is filtered with a nonlinear threshold, along with noise to be reduced or eliminated, part of boundary information of the image will be lost. Nevertheless, the human eye is highly sensitive at low-frequency component in an image, whereas the sensibility is greatly reduced at high-frequency component. Therefore, under an allowable range of human vision perception, the method can be used to obtain a better image quality. Another advantage of the adaptive threshold filtering is small amount of calculation, which is suitable for a video service system with high requirement of real time and interactive.

EMBODIMENTS OF THE INVENTION

The invention is described in detail, hereinafter, with reference to drawings. It should be noted that this is a description of the invention but not a limitation of the invention.

Figures 1, 2:
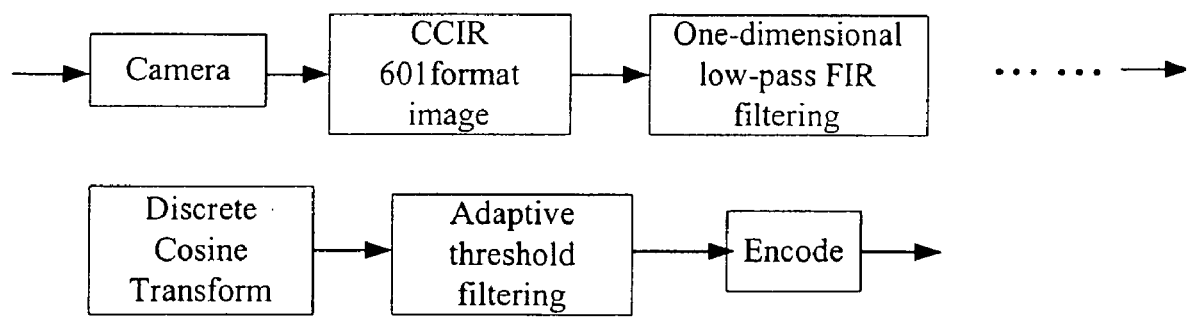
FIG. 1 shows a DCT coefficient distribution of 8×8 image blocks with H.26X (i.e. H261, H263, etc.) format.
FIG. 2 shows a framework of an embodiment of the pre-suppressing noise method for an image according to the present invention.

FIG. 2 shows a framework of an embodiment of the pre-suppressing noise method for an image, i.e. a filtering position in a H.26X video compression process. As shown in FIG. 2, in this embodiment there are two filters: a one-dimensional FIR filter and an adaptive threshold filter. The one-dimensional FIR filter is a linear high-frequency impulse noise filter, and the adaptive threshold filter is a nonlinear random noise filter. These two filters work at spatial domain and frequency domain, respectively. In the following, the one-dimensional low-pass FIR filter and the adaptive threshold filter are described, respectively.

As shown in FIG. 2, during a video image is being transformed from CCIR 601 format to CIF format, an one-dimensional FIR filter processes luminance component and chrominance component at horizontal and vertical direction, respectively; and the high-frequency impulse noise included in an image is suppressed. Naturally, a corresponding high-frequency part of the image is also filtered. Nevertheless, the human eye is highly sensitive at low-frequency component in an image, whereas the sensibility is greatly reduced at high-frequency component. By applying a low-pass filter with appropriate cut-off frequency, a better image quality can be obtained within the allowable range of human vision perception.

For cut-off frequency selection of one-dimensional FIR low-pass filter in this embodiment, a spectrum analysis will be taken by taking an image as one-dimensional signal. Comparing fitting curves of an image spectrum before H.26X compression and the image spectrum after reconstruction, differences between these two fitting curves are larger. After filtering with a smaller cut-off frequency (<0.5π) filter, differences of these two fitting curves are smaller. With the difference situation, a cut-off frequency range can be defined. In general, it is between 0.25π to 0.4π. Taking a seven order filter as an example, in this embodiment a low-pass FIR filter can be a filter with 0.4π cut-off frequency and h={-2/256, 12/256, 66/256, 104/256, 66/256, 12/256, -2/256}.

After filtering with one-dimensional FIR filter and H.26X compression, the compression bitrate of an image can be reduced by 10% to 20%. With a same quantized level, the image quality is no difference. Nevertheless, in a practical H.26X system, the general control strategy is that when buffer is decreased, the quantized level will be decreased to rise the image quality.

FIG. 1 shows DCT coefficients distribution of 8×8 image blocks with H.26X format. As shown in FIG. 1, after DCT transformation, low-frequency components of the 8×8 image block are distributed at the upper left part, and high-frequency components are distributed at the lower right part. The low-frequency components correspond to the image detail, and the high-frequency components correspond to the boundary part information of the image and noise, such as random noise and high-frequency impulse noise. Since most part of the high-frequency impulse noise has been filtered after filtering, so the main noise to be filtered is random noise, here.

Figure 3:
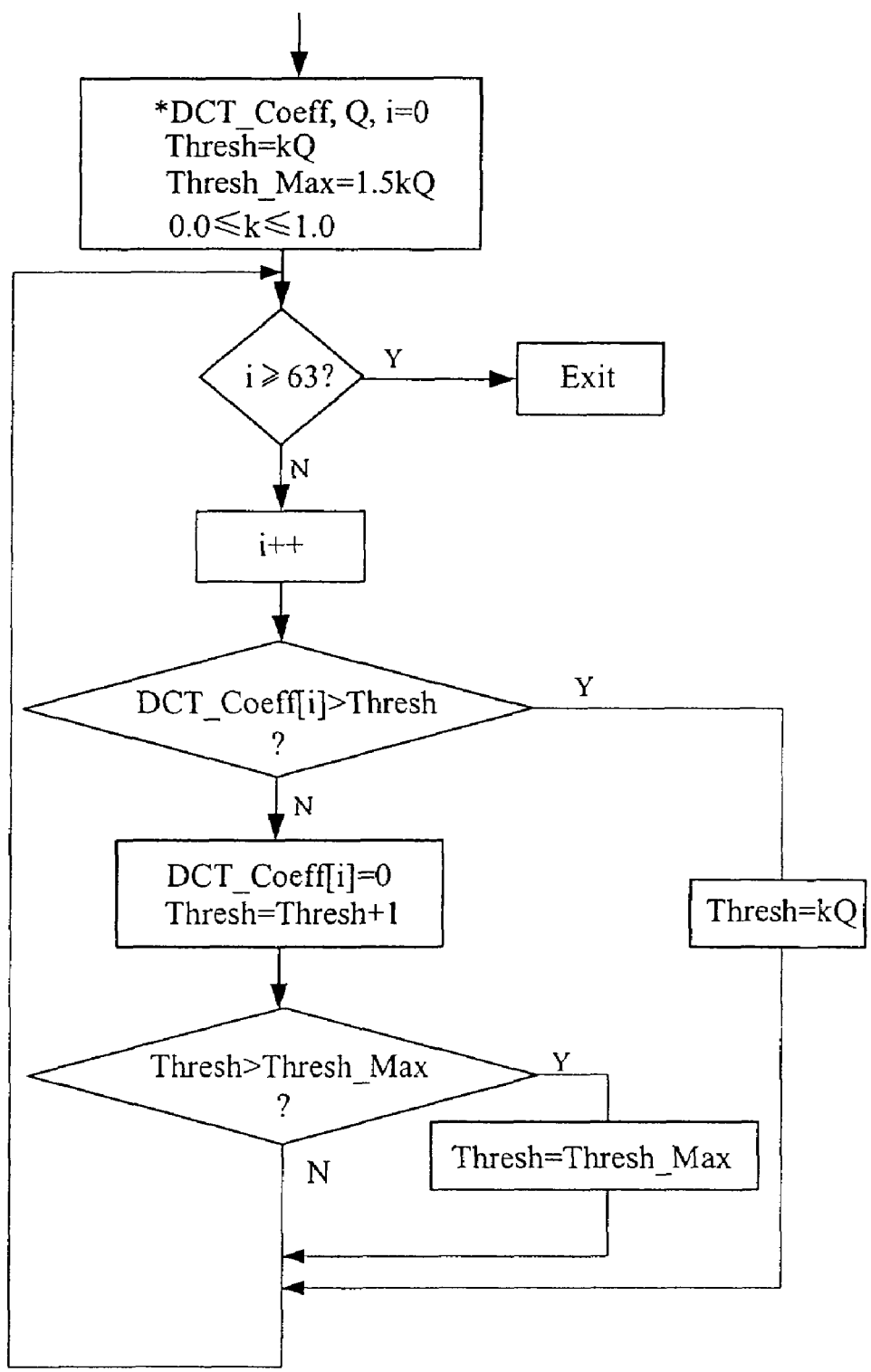
FIG. 3 shows a processing flowchart of adaptive threshold filtering in the FIG. 2 embodiment.

In this embodiment, the adaptive threshold filter scans a DCT coefficient table in a zigzag pattern, and 64 DCT coefficients are processed in sequence. The processing flowchart is shown in FIG. 3 in detail. In FIG. 3, *DCT_Coeff is a pointer of DCT coefficients. The threshold of a DCT coefficient Thresh is correlated with the quantized level Q. Comparing with a constant threshold, a varied threshold is more suitable to the change of image content and has advantage for protection the image important content. Thresh_Max is the upper limit of the threshold, and takes 1.5 kQ. The initial threshold takes kQ, wherein k is ranged between 0.0 to 1.0 and selected depending on the channel bandwidth. When the channel bandwidth is smaller, a larger k value will be selected; for example, when the channel bandwidth is less than 384 kbps, k will take 1.0. When the channel bandwidth is larger, a smaller k will be selected; for example, when the channel bandwidth is 2 Mbps, k will take 0.4. This treatment has advantage for obtaining as many as possible continuous zero. If a DCT coefficient is equal or less than threshold Thresh, the DCT coefficient will take value zero and the threshold Thresh will be added by one. When threshold Thresh is greater than the upper limit Thresh_Max, the threshold Thresh will take the Thresh_Max. If a DCT coefficient is greater than threshold Thresh, then the threshold Thresh will be recovered to the initial threshold kQ. This treatment has advantage for protecting important boundary information of an image.

Of course, when an image is filtered with a nonlinear threshold, noise will be reduced or eliminated, but at the same time, the boundary part information of the image will be lost. Nevertheless, the human eye is highly sensitive at low-frequency component in an image, whereas the sensibility is greatly reduced at high-frequency component. Therefore, under an allowable range of human vision perception, the method can be used to obtain a better image quality.

The embodiment is a high efficiency filtering method to reduce or eliminate video image noise. The method combines linear filtering and nonlinear filtering, and combines spatial domain filtering and frequency domain filtering together. The method applies one linear filter and one nonlinear filter. Therefore, with smaller amount of calculation, high-frequency impulse noise and random noise in a video image can be reduced or eliminated. In the first time filtering, a filter with lower cut-off frequency is applied to transform the format without increasing any amount of calculation. In the second time filtering, when quantizing a DCT coefficient, an adaptive threshold filter is applied. It can be seen from FIG. 3 that there is only increased a very small amount of calculation. By using the embodiment method to reduce or eliminate noise, the compression bitrate will be reduced by 10% to 30%, so the video compression efficiency and image quality will be risen.

Figure 4:
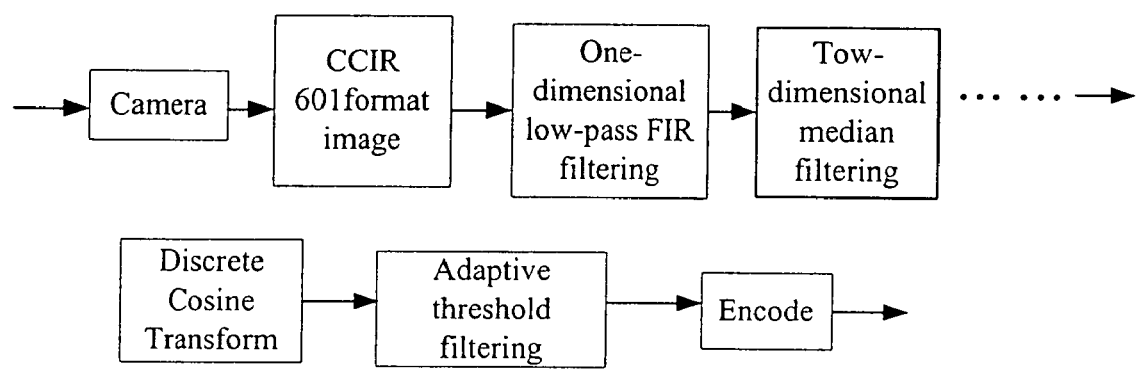
FIG. 4 shows a framework of another embodiment of the pre-suppressing noise method for an image according to the present invention.

FIG. 4 shows a framework of another embodiment of the invention, another embodiment framework of a pre-suppressing noise method for an image. This embodiment is based on the previous embodiment and added a 3×3 two-dimensional median filer set at the position before the image transformed to the CIF format. Since the amount of calculation is larger, the median filter is better implemented by hardware or DSP software. The median filter has characteristics which is better to reduce or eliminate impulse noise and is also better to keep image boundary information. So combining with the later processing by adaptive threshold filtering, a better reducing or eliminating noise effect of an image can be obtained.

It will be appreciated that the present invention is in no way limited to the embodiments, mentioned above. The preferred embodiments are only used for a detail description of the invention. It should be apparent to those skilled in the art that the invention can be modified or equivalently replaced without departing from the scope and spirit of the invention. Accordingly, we claim as our invention all such embodiments as come within the scope of the following claims and equivalents thereto.

The invention claimed is:

1. A method for pre-suppressing noise of an image, processing a DCT (Discrete Cosine Transform) coefficient value in sequence during quantizing the DCT coefficients value of a CIF (Common Intermediate Format) image blocks, comprises the steps of:

detecting whether the currently processed DCT coefficient value is equal to or less than a corresponding threshold used for this time, if it is, setting the DCT coefficient value to zero, then increasing the threshold of this time to be used as a threshold for the next processing of DCT coefficient, otherwise recovering the threshold of this time to be used as a threshold for the next processing of DCT coefficient to a predetermined initial threshold;

detecting whether the increased threshold is greater than a predetermined upper limit of a threshold, if it is, substituting the increased threshold with the predetermined upper limit.

2. The method of the claim 1, further comprising the step of:

respectively filtering luminance components and chrominance components at vertical and horizontal direction with a low-pass FIR filter which cut-off frequency being less than $0.5\pi$ during transforming a video image from the CCIR 601 format to the CIF format.

3. The method of the claim 2, wherein the low-pass FIR (Finite Impulse Response) filter is one-dimensional FIR filter.

4. The method of the claim 2, wherein the cut-off frequency of the low-pass FIR filter can be between $0.25\pi$ to $0.4\pi$.

5. The method of the claim 2, further comprising the step of:

further filtering the image by a two-dimensional median filter.

6. The method of the claim 1, wherein increasing the threshold of this time to be used as a threshold for the next processing of DCT coefficient by one.

7. The method of the claim 1, the sequence of processing DCT coefficients value is starting from the upper left corner of a DCT coefficient table and ordering in a zigzag pattern.

8. The method of the claim 1, wherein the initial threshold and the upper limit of threshold can be predetermined with that the initial threshold equals to kQ and the upper limit of threshold equals 1.5 kQ, wherein the Q is the quantized level and the k is a constant between 0 to 1 determined by the channel bandwidth.

* * * * *